(12) United States Patent
Le Blevennec et al.

(10) Patent No.: US 11,294,130 B2
(45) Date of Patent: Apr. 5, 2022

(54) OPTICAL SYSTEM

(71) Applicant: COMMISSARIAT A L'ENERGIE ATOMIQUE ET AUX ENERGIES ALTERNATIVES, Paris (FR)

(72) Inventors: Gilles Le Blevennec, Grenoble (FR); Philippe Berne, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/270,314

(22) PCT Filed: Aug. 20, 2019

(86) PCT No.: PCT/FR2019/051940
§ 371 (c)(1),
(2) Date: Feb. 22, 2021

(87) PCT Pub. No.: WO2020/039144
PCT Pub. Date: Feb. 27, 2020

(65) Prior Publication Data
US 2021/0173161 A1    Jun. 10, 2021

(30) Foreign Application Priority Data

Aug. 24, 2018  (FR) ...................... 1857655

(51) Int. Cl.
*G02B 6/42* (2006.01)
*F21V 8/00* (2006.01)

(52) U.S. Cl.
CPC ......... *G02B 6/4298* (2013.01); *G02B 6/0006* (2013.01)

(58) Field of Classification Search
CPC .... G02B 6/4298; G02B 6/0006; G02B 6/003; G02B 6/002
See application file for complete search history.

(56) References Cited

U.S. PATENT DOCUMENTS

| 2015/0011837 A1* | 1/2015 | Johnson | G02B 6/0008 |
| | | | 600/249 |
| 2015/0309272 A1* | 10/2015 | Cobb | G02B 6/4256 |
| | | | 385/93 |

FOREIGN PATENT DOCUMENTS

| CN | 202720356 U | * | 2/2013 | ............... G02B 6/00 |
| CN | 202720356 U | | 2/2013 | |

OTHER PUBLICATIONS

International Search Report dated Jan. 27, 2020 in PCT/FR2019/051940 filed on Aug. 20, 2019, 2 pages.

* cited by examiner

*Primary Examiner* — Donald L Raleigh
(74) *Attorney, Agent, or Firm* — Oblon, McClelland, Maier & Neustadt, L.L.P.

(57) ABSTRACT

The invention relates to an optical system having a light source, configured to emit electromagnetic radiation; a waveguide, configured to guide the electromagnetic radiation in a guiding direction and having an input; and an injection device, configured to inject the electromagnetic radiation emitted by the light source at the input of the waveguide. The injection device consists of a single dioptric interface designed to focus the electromagnetic radiation emitted by the light source at the input of the waveguide.

10 Claims, 3 Drawing Sheets

OPTICAL SYSTEM

TECHNICAL FIELD

The invention relates to the technical field of injecting light into a waveguide.

The invention is notably applicable to:
the manufacture of flat screens for computers or television sets,
lighting of large areas,
spectroscopic sensors such as fluid (e.g. a gas) sensors, particle sensors and biological sensors.

PRIOR ART

An optical system known in the prior art, and notably from document WO 2013/139721, comprises:
a light source, suitable for emitting electromagnetic radiation;
a waveguide, suitable for guiding the electromagnetic radiation in a guiding direction, and having an entrance; and
an injecting device, suitable for injecting the electromagnetic radiation emitted by the light source into the entrance of the waveguide.
The injecting device comprises:
a parabolic mirror or an optical lens, the light source being placed at the focal point of the parabolic mirror or at the focal point of the optical lens so as to obtain electromagnetic radiation parallel to the guiding direction; and
a receiving surface, arranged to deviate by refraction the parallel electromagnetic radiation toward the entrance of the waveguide.

Such a prior-art optical system allows the injection of light to be significantly improved when the waveguide is not very thick (i.e. of a thickness smaller than or equal to 1 mm) and when the light source has a very open emission beam (e.g. a light-emitting diode).

However, such a prior-art optical system is not entirely satisfactory insofar as it combines two types of optical components (i.e. a parabolic mirror or optical lens and a receiving surface), resulting in a certain complexity in the injecting device, this possibly being disadvantageous in certain applications.

DISCLOSURE OF THE INVENTION

The invention aims to fully or partly rectify the above-mentioned drawbacks. To this end, the subject of the invention is an optical system, comprising:
a light source, suitable for emitting electromagnetic radiation;
a waveguide, suitable for guiding the electromagnetic radiation in a guiding direction, and having an entrance; and
an injecting device, suitable for injecting the electromagnetic radiation emitted by the light source into the entrance of the waveguide;
noteworthy in that the injecting device consists of a single dioptric interface designed to focus the electromagnetic radiation emitted by the light source onto the entrance of the waveguide.

Thus, such an optical system according to the invention allows a satisfactory injection of light to be obtained when the waveguide is not very thick (i.e. of a thickness smaller than or equal to 1 mm) and when the light source has a very open emission beam (e.g. a light-emitting diode), while significantly simplifying the injecting device with respect to the prior art, the injecting device consisting of a single dioptric interface.

Definitions

By "consisting", what is meant is that the presence in the injecting device of any optical element other than the single dioptric interface (for example the presence of optical lenses, mirrors or other reflectors) is excluded.

By "dioptric interface" what is meant is a surface separating two media of different refractive indices.

By "focus" what is meant is concentrating light rays emitted by the light source on a point of the waveguide.

The optical system according to the invention may comprise one or more of the following features.

According to one feature of the invention, the electromagnetic radiation emitted by the light source possesses a wavelength, denoted $\lambda$, and the single dioptric interface comprises a segment extending in a direction perpendicular to the guiding direction, said segment having a dimension larger than or equal to $10\lambda$. Thus, one obtained advantage is that multimode propagation of electromagnetic radiation through the waveguide is permitted.

According to one feature of the invention, the single dioptric interface extends to the entrance of the waveguide.

Thus, one obtained advantage is that a continuity in refractive index between the dioptric interface and the waveguide, in the absence of a gel, adhesive or other additive is permitted.

According to one feature of the invention, the single dioptric interface is fastened to the entrance of the waveguide by welding or adhesive bonding.

Thus, one obtained advantage is that mounting of the single dioptric interface on the waveguide is facilitated.

According to one feature of the invention, the single dioptric interface and the waveguide are integrally formed.

Thus, one obtained advantage is that an excellent continuity in refractive index between the dioptric interface and the waveguide is ensured.

According to one feature of the invention, the single dioptric interface is made of a material chosen from polymethyl methacrylate, polycarbonate, and a glass.

Thus, one obtained advantage of using such materials is that they are transparent in the visible range. Furthermore, polymethyl methacrylate and polycarbonate allow the single dioptric interface to be manufactured by molding.

According to one feature of the invention, the light source is Lambertian.

According to one feature of the invention, the waveguide is chosen from a planar guide and a cylindrical guide.

According to one feature of the invention, the single dioptric interface has a geometric shape defined by the following equations:

$$f_0 = y + \frac{x}{\tan\left[\arctan(y') - \arcsin\left(n_1/n_2 \sin\left(\arctan(y') + \arctan\left(\frac{x}{d+y}\right)\right)\right)\right]}$$

$$y(0) = 0$$

$$y''(0) = \frac{1}{n_2 - n_1}\left(\frac{n_1}{d} + \frac{n_2}{f_0}\right)$$

where:

x and y designate the abscissa and the ordinate of the single dioptric interface in a plane provided with a Cartesian coordinate system, respectively;

y' and y" designate the first derivative and the second derivative of y, respectively;

tan, arctan, sin and arcsin designate the tangent, arc tangent, sine and arc sine functions, respectively;

$n_1$ and $n_2$ designate the refractive indices of the two media separated by the single dioptric interface, $n_1$ being the refractive index of the medium containing the light source, and $n_2$ being the refractive index of the medium containing the waveguide;

d designates the distance separating the light source from the origin of the Cartesian coordinate system; and $f_0$ designates the distance separating the entrance of the waveguide from the origin of the Cartesian coordinate system.

Thus, one advantage obtained via such a geometric shape of the dioptric interface is to permit the light rays emitted by a Lambertian point source to be focused onto the entrance of the waveguide, without the presence of additional optical elements.

Furthermore, numerical simulations have shown that the dioptric interface has the following properties:

(i) the principle of reversibility of the path of light is respected, (ii) a focus may be obtained by varying the position of the light source along the optical axis (between −50% and 40% with respect to the initial position, located at the distance d from the origin of the Cartesian coordinate system), (iii) a focus may also be obtained for a spread Lambertian source, when the spread thereof is smaller than 20% of the distance d, and (iv) bringing the light source closer to the dioptric interface (i.e. when d tends toward 0) allows the solid angle intercepted by the dioptric interface to be increased and thereby the light flux guided in the waveguide to be increased.

According to one feature of the invention, the ratio $d/f_0$ is lower than or equal to 0.5.

Thus, one obtained advantage is significantly increasing the solid angle intercepted by the dioptric interface.

According to one feature of the invention, the ratio $n_2/n_1$ is higher than or equal to 1.5.

Thus, one obtained advantage is significantly increasing the solid angle intercepted by the dioptric interface.

BRIEF DESCRIPTION OF THE DRAWINGS

Other features and advantages will become apparent in the detailed description of various embodiments of the invention, the description being accompanied by examples and references to the appended drawings.

DETAILED DISCLOSURE OF THE EMBODIMENTS

For the sake of simplicity, elements that are identical or that perform the same function in the various embodiments will bear the same references.

Figure 1:
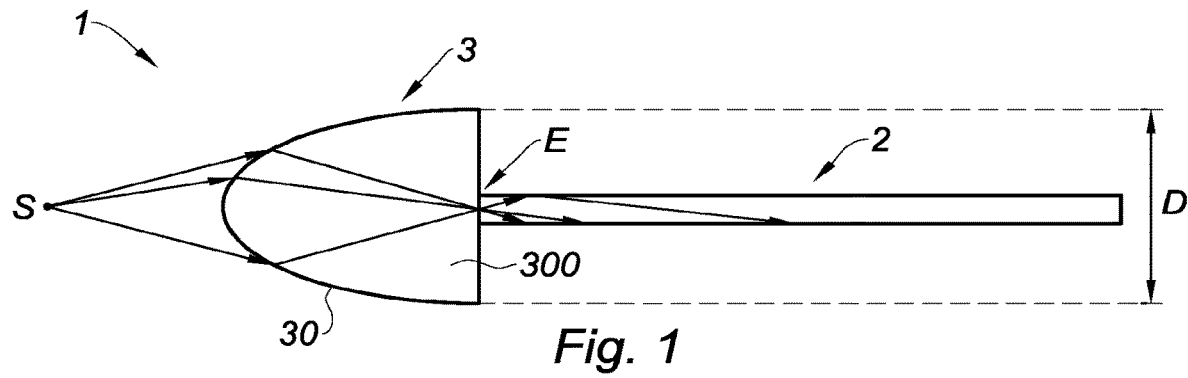
FIG. 1 is a schematic view in longitudinal cross section of an optical system according to the invention, illustrating one embodiment of the single dioptric interface.

As illustrated in FIG. 1, one subject of the invention is an optical system 1, comprising:

a light source S, suitable for emitting electromagnetic radiation;

a waveguide 2, suitable for guiding the electromagnetic radiation in a guiding direction, and having an entrance E; and an injecting device 3, suitable for injecting the electromagnetic radiation emitted by the light source S into the entrance E of the waveguide 2.

The injecting device 3 consists of a single dioptric interface 30 designed to focus the electromagnetic radiation emitted by the light source S onto the entrance E of the waveguide 2.

Light Source

The light source S is preferably Lambertian, i.e. the luminance of the light source S is preferably identical in every emission direction. The light source S may be a point source or a spread source.

The electromagnetic radiation emitted by the light source S possesses a wavelength, denoted λ, preferably comprised between 380 nm and 780 nm (visible domain). However, other wavelengths are possible, for example in the near infrared (780 nm-3 µm) or in the near ultraviolet (315 nm-380 nm). With respect to application to the manufacture of spectroscopic sensors, the wavelength of the light source S is preferably in the infrared range (1 µm-10 µm).

By way of non-limiting example, the light source S may be a light-emitting diode. The light source S may have an emitting area larger than or equal to 1 $mm^2$. The light source S may have a very open emission beam (more than ±30° from the optical axis, for example ±60° from the optical axis).

Waveguide

The waveguide 2 is advantageously chosen from a planar guide and a cylindrical guide. The waveguide 2 may take the form of a thin film. The waveguide 2 may also take the form of an optical fiber. The waveguide 2 advantageously has a thickness smaller than or equal to 5 mm. The waveguide 2 is advantageously made of a material that is transparent in the visible domain, the material preferably being chosen from polymethyl methacrylate, polycarbonate, and a glass. The glass is preferably a borosilicate glass. Generally, the waveguide 2 is advantageously made of a material that is transparent at the wavelength of the electromagnetic radiation emitted by the light source S.

Dioptric Interface

The electromagnetic radiation emitted by the light source S possesses a wavelength, denoted λ. The single dioptric interface 30 advantageously comprises a segment 300 extending in a direction perpendicular to the guiding direction, said segment 300 having a dimension D larger than or equal to 10λ.

The single dioptric interface 30 advantageously extends to the entrance E of the waveguide 2.

The single dioptric interface 30 may be fastened to the entrance E of the waveguide 2 by welding or adhesive bonding. According to one alternative, the single dioptric interface 30 and the waveguide 2 are integrally formed, for example by molding.

The single dioptric interface 30 is advantageously made of a material that is transparent in the visible domain, the material preferably being chosen from polymethyl methacrylate, polycarbonate, and a glass. The glass is preferably a borosilicate glass. Generally, the single dioptric interface 3 is advantageously made of a material that is transparent at the wavelength of the electromagnetic radiation emitted by the light source S.

When the light source S is Lambertian, the single dioptric interface 30 advantageously has a geometric shape defined by the following equations:

$$f_0 = y + \frac{x}{\tan\left[\arctan(y') - \arcsin\left(n_1/n_2 \sin\left(\arctan(y') + \arctan\left(\frac{x}{d+y}\right)\right)\right)\right]} \quad (1.1)$$

$$y(0) = 0 \quad (1.2)$$

$$y''(0) = \frac{1}{n_2 - n_1}\left(\frac{n_1}{d} + \frac{n_2}{f_0}\right) \quad (1.3)$$

where:
- x and y designate the abscissa and the ordinate of the single dioptric interface 30 in a plane provided with a Cartesian coordinate system, respectively;
- y' and y'' designate the first derivative and the second derivative of y, respectively;
- tan, arctan, sin and arcsin designate the tangent, arc tangent, sine and arc sine functions, respectively;
- $n_1$ and $n_2$ designate the refractive indices of the two media separated by the single dioptric interface 30, $n_1$ being the refractive index of the medium containing the light source S, and $n_2$ being the refractive index of the medium containing the waveguide 2;
- d designates the distance separating the light source S from the origin O of the Cartesian coordinate system; and
- $f_0$ designates the distance separating the entrance E of the waveguide 2 from the origin O of the Cartesian coordinate system.

Figure 2:
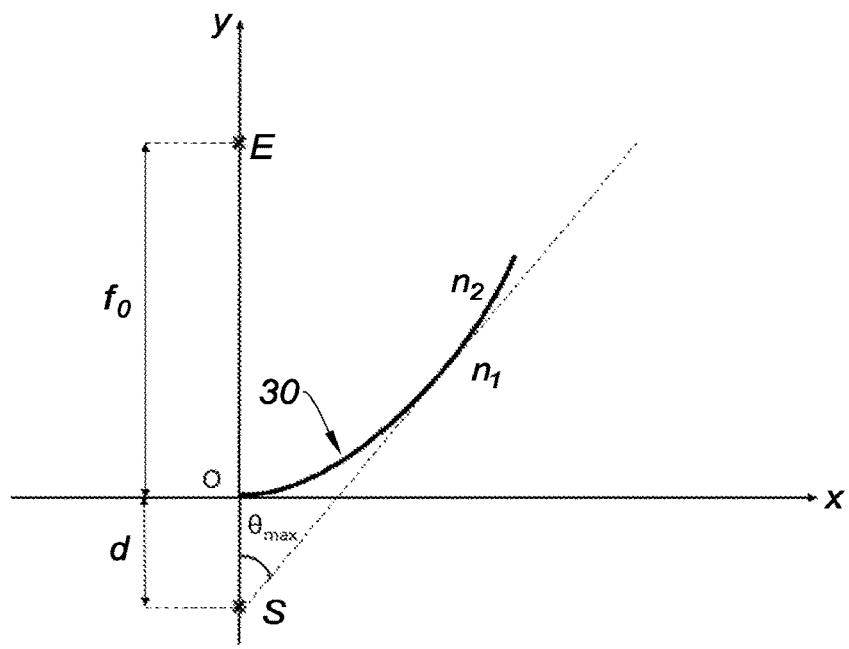
FIG. 2 is a graph illustrating the parameters of an optical system according to the invention in a Cartesian coordinate system.

Equation (1.1) is derived from trigonometric relationships in combination with Snell's law, the parameters of equation (1.1) being illustrated in FIG. 2.

Equation (1.2) establishes a boundary condition, the single dioptric interface 30 extending from the origin O of the Cartesian coordinate system.

Equation (1.3) establishes a new boundary condition, and is derived from an expansion limited to the order 2 of the function y (x)—Taylor's theorem—.

Figure 3:
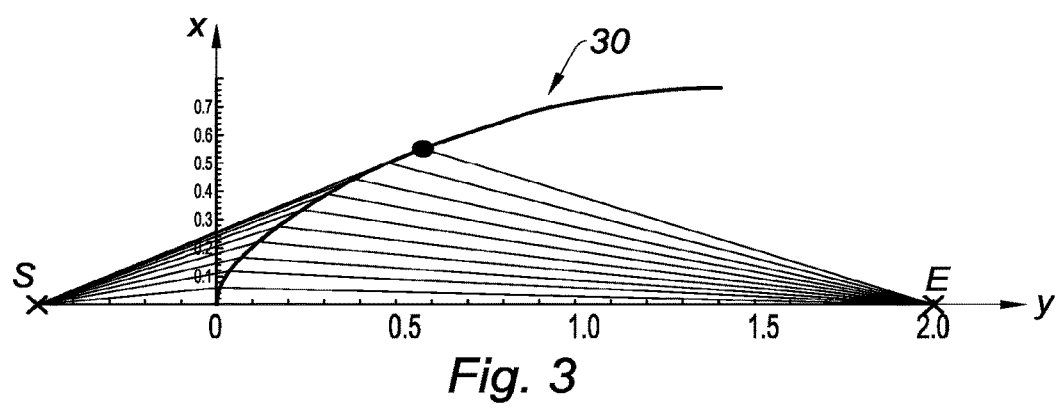
FIG. 3 is a graph illustrating, using a ray trace model, an optical system according to the invention with a single dioptric interface focusing the electromagnetic radiation emitted by the light source onto the entrance of the waveguide.

Numerical simulations with ray tracing (an example is illustrated in FIG. 3) have shown that it is possible to define a geometric shape of the dioptric interface 30 such as to allow the electromagnetic radiation emitted by the Lambertian light source S to be focused onto the entrance E of the waveguide 2.

Furthermore, numerical simulations have shown that the dioptric interface 30 has the following properties:
(i) the principle of reversibility of the path of light is respected,
(ii) a focus may be obtained by varying the position of the light source S along the optical axis (between −50% and 40% with respect to the initial position, located at the distance d from the origin of the Cartesian coordinate system),
(iii) a focus may also be obtained for a spread Lambertian light source S, when the spread thereof is smaller than 20% of the distance d, and
(iv) bringing the light source S closer to the dioptric interface 30 (i.e. when d tends toward 0) allows the solid angle intercepted by the dioptric interface 30 to be increased and thereby the light flux guided in the waveguide 2 to be increased.

Figure 5:
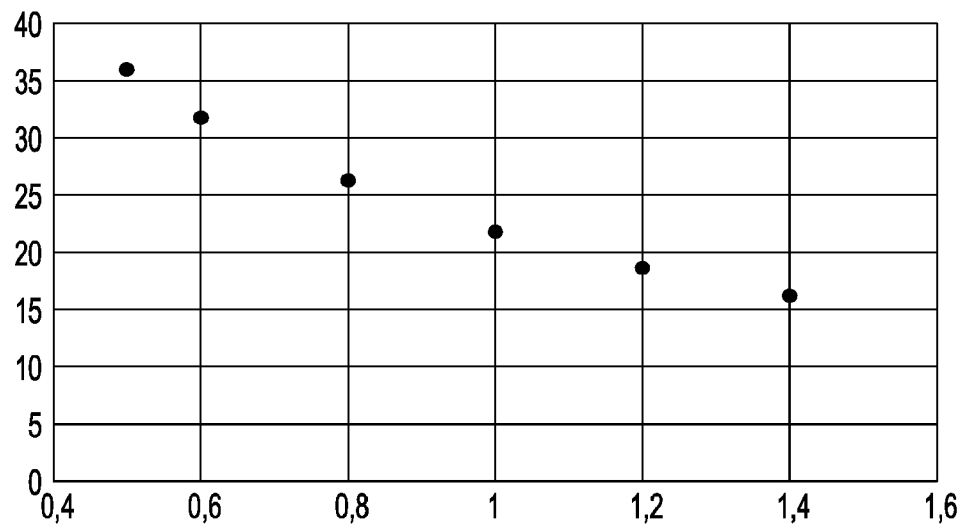
FIG. 5 is a graph in which the x-axis represents the relative position of the light source ("1" being the initial position of the light source, located at the distance d from the origin of the Cartesian coordinate system), and in which the y-axis represents the percentage of the light flux emitted by the light source that is focused onto the entrance of the waveguide. The data of FIG. 5 were obtained from numerical simulations.
Figure 6:
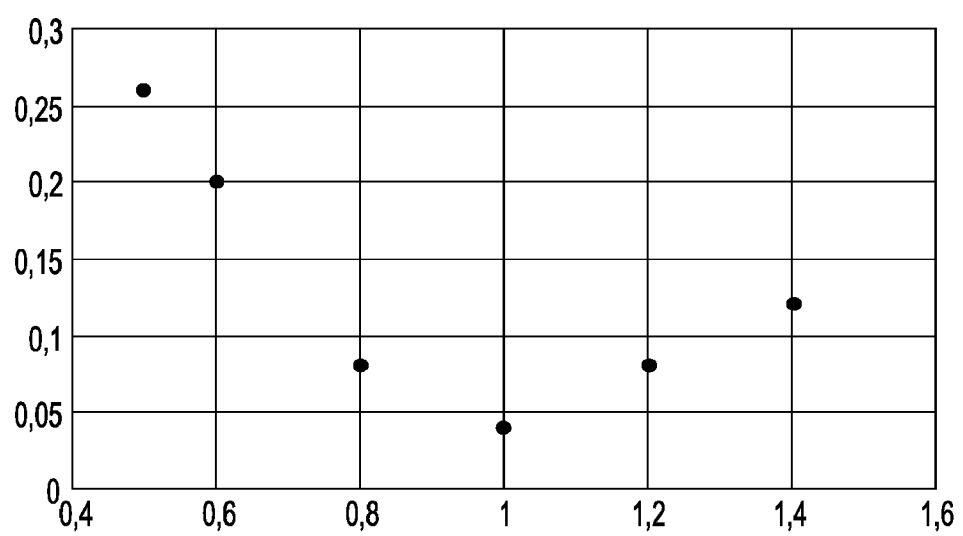
FIG. 6 is a graph in which the x-axis represents the relative position of the light source ("1" being the initial position of the light source, located at the distance d from the origin of the Cartesian coordinate system), and in which the y-axis represents the diameter (in mm) of the focal spot of the electromagnetic radiation at the entrance of the waveguide. The data of FIG. 6 were obtained from numerical simulations.

Property (ii) is illustrated in FIGS. 5 and 6. As illustrated in FIG. 6, numerical simulations have shown that the focal spot of the electromagnetic radiation at the entrance of the waveguide 2 has a diameter of 0.04 mm for the initial position of the light source S, located at the distance d from the origin of the Cartesian coordinate system. The diameter of the focal spot remains smaller than 0.26 mm when the position of the light source S on the optical axis is varied between −50% and 40% with respect to the initial position. As illustrated in FIG. 5, numerical simulations have shown that the percentage of the light flux emitted by the light source S that is focused onto the entrance of the waveguide 2 is about 22% for the initial position of the light source S, located at the distance d from the origin of the Cartesian coordinate system. The percentage of the light flux remains higher than 16% when the position of the light source S on the optical axis is varied between −50% and 40% with respect to the initial position.

A geometric shape (defined by equations (1.1), (1.2) and (1.3)) of the dioptric interface 30 may also be defined with negative refractive indices n1, n2, and also allows the electromagnetic radiation emitted by the Lambertian light source S to be focused onto the entrance E of the waveguide 2. Such negative refractive indices may be obtained in practice if the materials separated by the dioptric interface 30 are chosen to be metamaterials, so-called left-handed metamaterials for example. Metamaterials are advantageously used when the electromagnetic radiation emitted by the light source S has a frequency range comprised between 3 MHz and 50 THz. Specifically, metamaterials are easier to manufacture for this frequency range. This frequency range thus covers:
- the HF, VHF, UHF, and SHF domains, which extend from 3 MHz to 30 GHz (also called the radar domain because of its applications), the EHF domain, i.e. what are also called microwave frequencies (30 GHz to 300 GHz), the terahertz domain (300 GHz to 20 THz), and the far infrared domain (20 THz to 50 THz).

Photonic structures—or photonic crystals—comprising magnetic resonators formed by coupled metal rings may be used to manufacture metamaterials. The refractive index of a metamaterial is an effective (negative) index of an effective medium. Thus, the photonic structures forming the metamaterials are considered to be an effective medium. The effective-medium approach requires the photonic structures to have a characteristic dimension smaller than the wavelength of the light source S.

Figure 4:
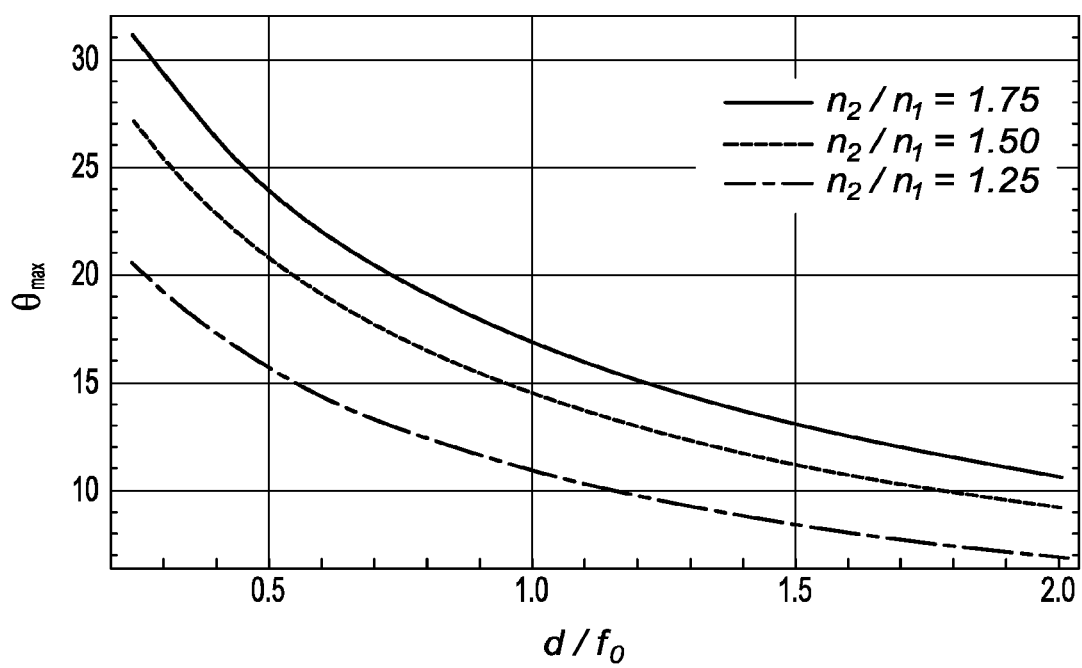
FIG. 4 is a graph in which the x-axis represents the ratio between d (distance separating the light source from the origin of the Cartesian coordinate system illustrated in FIG. 2) and $f_0$ (distance separating the entrance of the waveguide from the origin of the Cartesian coordinate system illustrated in FIG. 2), and in which the y-axis represents the maximum angle ($\theta_{max}$, illustrated in FIG. 2) intercepted by the dioptric interface, for various ratios $n_2/n_1$ of the refractive indices of the two media separated by the single dioptric interface.

As illustrated in FIG. 4, the ratio $d/f_0$ is advantageously lower than or equal to 0.5 so as to significantly increase the solid angle intercepted by the dioptric interface 30.

In the same way, as illustrated in FIG. 4, the ratio $n_2/n_1$ is advantageously higher than or equal to 1.5 so as to significantly increase the solid angle intercepted by the dioptric interface 30.

Application: Spectroscopic Sensor

The optical system 1 may be connected to a coupler or to a multiplexer (e.g. an arrayed waveguide grating (AWG)) for the manufacture of a gas sensor. The measurement will possibly be taken using photo-acoustic techniques.

As regards the manufacture of a particle sensor, the waveguide 2 of the optical system 1 may be provided with an orifice suitable for receiving the particles.

As regards the manufacture of a biological sensor, the waveguide 2 of the optical system 1 (which will preferably be made of silicon nitride) may be oriented toward regions of tissues to be analyzed.

The invention is not limited to the described embodiments. Those skilled in the art will be able to envisage technically workable combinations thereof and to substitute equivalents therefor.

The invention claimed is:

1. The optical system, comprising:

a light source configured to emit electromagnetic radiation;

a waveguide configured to guide the electromagnetic radiation in a guiding direction, and having an entrance; and an injecting device configured to inject the electromagnetic radiation emitted by the light source into the entrance of the waveguide, wherein the injecting device consists of a single dioptric interface configured to focus the electromagnetic radiation emitted by the light source onto the entrance of the waveguide, and the single dioptric interface has a geometric shape defined by the following equations:

$$f_0 = y + \frac{x}{\tan\left[\arctan(y') - \arcsin\left(n_1/n_2 \sin\left(\arctan(y') + \arctan\left(\frac{x}{d+y}\right)\right)\right)\right]}$$

$$y(0) = 0$$

$$y''(0) = \frac{1}{n_2 - n_1}\left(\frac{n_1}{d} + \frac{n_2}{f_0}\right)$$

where:

x and y designate the abscissa and the ordinate of the single dioptric interface in a plane provided with a Cartesian coordinate system, respectively;

y' and y" designate a first derivative and a second derivative of y, respectively;

tan, arctan, sin and arcsin designate the tangent, arc tangent, sine and arc sine functions, respectively;

$n_1$ and $n_2$ designate refractive indices of two media separated by the single dioptric interface, $n_1$ being the refractive index of a medium containing the light source, and $n_2$ being the refractive index of a medium containing the waveguide;

d designates a distance separating the light source from an origin of the Cartesian coordinate system; and $f_0$ designates a distance separating the entrance of the waveguide from the origin of the Cartesian coordinate system.

2. The optical system as claimed in claim 1, wherein the electromagnetic radiation emitted by the light source possesses a wavelength, denoted λ, and wherein the single dioptric interface comprises a segment extending in a direction perpendicular to the guiding direction, said segment having a dimension larger than or equal to 10λ.

3. The optical system as claimed in claim 1, wherein the single dioptric interface extends to the entrance of the waveguide.

4. The optical system as claimed in claim 3, wherein the single dioptric interface is fastened to the entrance of the waveguide by welding or adhesive bonding.

5. The optical system as claimed in claim 3, wherein the single dioptric interface and the waveguide are integrally formed.

6. The optical system as claimed in claim 1, wherein the single dioptric interface is made of a material chosen from polymethyl methacrylate, polycarbonate, and a glass.

7. The optical system as claimed in claim 1, wherein the light source is Lambertian.

8. The optical system as claimed in claim 1, wherein the waveguide is chosen from a planar guide and a cylindrical guide.

9. The optical system as claimed in claim 1, wherein a ratio $d/f_0$ is lower than or equal to 0.5.

10. The optical system as claimed in claim 1, wherein a ratio $n_2/n_1$ is higher than or equal to 1.5.

* * * * *